United States Patent [19]

Nauta et al.

[11] 4,207,296

[45] Jun. 10, 1980

[54] PROCESS FOR PRODUCING PURIFIED AMMONIUM MOLYBDATE SOLUTION

[75] Inventors: Harry H. K. Nauta, Brielle; Jan W. Kok, Poortugaal; Jan Harte, Vierpolders, all of Netherlands

[73] Assignee: Amax Inc., Greenwich, Conn.

[21] Appl. No.: 942,835

[22] Filed: Sep. 15, 1978

[51] Int. Cl.² ............................................. C01G 39/00
[52] U.S. Cl. ...................................... 423/61; 423/593; 423/606
[58] Field of Search .......................... 423/61, 593, 606

[56] References Cited

U.S. PATENT DOCUMENTS

| | | | |
|---|---|---|---|
| 3,848,049 | 11/1974 | Ronzio et al. | 423/606 |
| 3,932,580 | 1/1976 | Vertes et al. | 423/61 |
| 3,957,946 | 5/1976 | Ronzio et al. | 423/61 |
| 4,046,852 | 9/1977 | Vertes et al. | 423/61 |

*Primary Examiner*—Herbert T. Carter
*Attorney, Agent, or Firm*—Michael A. Ciomek

[57] ABSTRACT

Molybdenum trioxide containing potassium is heated to a temperature sufficiently high (i.e. at least about 525° C.) to render the potassium soluble in hot water, the heated trioxide is quenched to less than about 400° C. at a rate of at least about 30° C. per minute, the quenched trioxide is leached with hot water (between about 50° C. and about 100° C.) to leach the solubilized potassium and after liquid-solids separation the molybdenum trioxide is dissolved in ammonium hydroxide to form ammonium molybdates, which can be recovered from solution and then can be calcined to chemical grade molybdic oxide. The process is advantageously conducted in conjunction with the roasting of molybdenite.

44 Claims, 3 Drawing Figures

PROCESS FOR PRODUCING PURIFIED AMMONIUM MOLYBDATE SOLUTION

BACKGROUND OF THE INVENTION

Molybdenum is principally found in the earth's crust in the form of molybdenite ($MoS_2$) distributed as very fine veinlets in quartz which is present in an ore body comprised predominantly of altered and highly silicified granite. The concentration of the molybdenite in such ore bodies is relatively low, that is, in amounts between about 0.1% and about 0.6%, by weight. The molybdenite is present in the form of relatively soft, hexagonal, black flaky crystals which are extracted from the ore body and concentrated by one of a variety of known beneficiation processes so as to increase the molybdenum disulfide content to a level of usually about greater than 80%, by weight of the concentrate. The resulting concentrate is subjected to an oxidation step, which usually is performed by a roasting operation in the presence of air, whereby the molybdenum disulfide is converted to molybdenum oxide which is of a commercial or technical grade containing various impurities including metallic contaminants present in the original ore body.

It is desirable or necessary to provide in some instances a molybdenum product for molybdate compounds which are relatively free of such metallic contaminants providing a high purity material for use in the preparation of molybdenum compounds, catalysts, chemical reagents or the like, wherein the presence of potassium is detrimental. The production of high purity ammonium molybdate and molybdenum oxide has heretofore been achieved by various chemical and physical refining techniques, of which the sublimation of technical grade oxide at elevated temperatures, e.g., about 1000° C. or higher, and recovering the sublimed molybdenum trioxide of a purity usually of about 99% or greater, is perhaps the most common method. Unfortunately, the sublimation process is inefficient, producing a purified molybdenum trioxide in relatively low yields, necessitating a recycling and further processing of the residue to recover the residual molybdenum values therein, which still further detracts from the economics of the purification process.

Particular attention has been given in recent years to the potassium content of molybdenum trioxide, and generally molybdenum trioxide having less than about 100 parts per million (ppm), e.g. between about 40 ppm and about 80 ppm potassium. Purified oxide of this quality is specified for manufacture of molybdenum powder which goes into the production of wire, rod, sheet, sinter parts and other mill products, special alloys and chemically pure molybdenum salts such as might be used in catalysts.

Typical processes for treating molybdenum disulfide or molybdenum trioxide to produce chemical grade molybdenum trioxide are disclosed in U.S. Pat. Nos. 1,888,978; 1,923,652; 3,139,326; 3,351,423; 3,393,971; 3,848,049; 3,932,580; 3,957,946.

SUMMARY OF THE INVENTION

Generally speaking, the process in accordance with the present invention comprises maintaining molybdenum trioxide containing potassium at a temperature sufficiently high and for a time sufficiently long to render the potassium soluble in hot water, cooling the molybdenum trioxide containing the potassium in the water soluble at a rate greater than about 30° C. per minute to a temperature less than about 400° C., leaching the potassium in the water soluble state from the molybdenum trioxide with hot water, separating the molybdenum trioxide from the leach water, and digesting the separated molybdenum trioxide in ammonium hydroxide to produce a purified ammonium molybdate solution. Ammonium molybdate can be recovered from the solution and calcined to chemical grade molybdenum trioxide.

The process in accordance with the present invention is most advantageously conducted in conjunction with the roasting of molybdenite. A molybdenite concentrate containing potassium is fed to a roaster, the concentrate is heated to a temperature between about 550° C. and 1400° C. in a free oxygen containing atmosphere to oxidize molybdenum disulfide to molybdenum trioxide having a sulfur content less than about 0.5% (advantageously less than about 0.1%), the molybdenum trioxide is cooled to about 400° C. (advantageously, to less than about 200° C.) at a rate greater than about 30° C. per minute from a temperature sufficiently high that the potassium is rendered soluble in hot water, the cooled molybdenum trioxide is leached with hot water to leach potassium therefrom, the molybdenum trioxide is separated from the leach water and is digested in an ammonium solution to form ammonium molybdates which can be recovered from solution and calcined to chemical grade molybdenum trioxide.

DETAILED DESCRIPTION OF THE INVENTION

Molybdenum is found in the earth's crust predominantly in the form of molybdenite ($MoS_2$), of which the largest known source is at Climax, Colo., in which the ore body comprises a highly silicified and altered granite through which the molybdenite is distributed in the form of very fine sized veinlets usually ranging in concentration from about 0.1% to about 0.6% as mined. The concentration of the molybdenite constituent is increased preferably through an oil flotation extraction operation to reduce the gangue to a level less than about 40%, and preferably less than about 10%. The flotation extraction operation requires that the ore as mined is ground to a relatively fine particle size, usually 35% plus 100 mesh, whereafter the particles of molybdenite are separated from the siliceous gangue materials employing a hydrocarbon oil and pine oil in combination with various wetting agents. The particles comprised predominantly of molybdenite are retained in the flotation froth while the more dense gangue particles consisting predominently of silica remain in the tailing portion of the pulp. The oil flotation beneficiation process is normally carried out in a series of successive cycles, each including a grinding step followed by a flotation step in which the particle size of the ore is progressively reduced, and wherein the concentration of molybdenite in the extracted product is progressively increased until the desired concentration of molybdenite is obtained. This may range from molybdenite contents of about 80% to as high as about 90% and even greater, depending upon the intended end use to which the concentrate is to be applied. The molybdenite concentrate derived from the oil flotation extraction operation is transferred to a roasting operation in which an excess amount of a free oxygen containing gas is introduced to effect a conversion of the molybdenum disulfide to molybdenum oxides. The roaster may be any one of a variety of roasters, including fluid bed reactors, flash roasters or multiple hearth furnaces such as, for example, Herreschoff, McDougal, Wedge, Nichols, etc. The process in accordance with the present invention will be described in conjunction with a Herreshoff roaster, which generally comprises a plurality of annular shaped hearths disposed in vertically spaced relationship, on which the molybdenite concentrate being roasted is transferred from the uppermost hearth in a cascading fashion downward to the lowermost hearth while being exposed to a countercurrent flow of hot flue gasses to effect a roasting oxidation of a molybdenite to molybdenum oxide at temperatures generally ranging from about 550° C. to about 750° C. The time, temperature and excess oxygen relationship is controlled so that substantially all the original molybdenite is oxidized to molybdenum trioxide.

Figure 1:
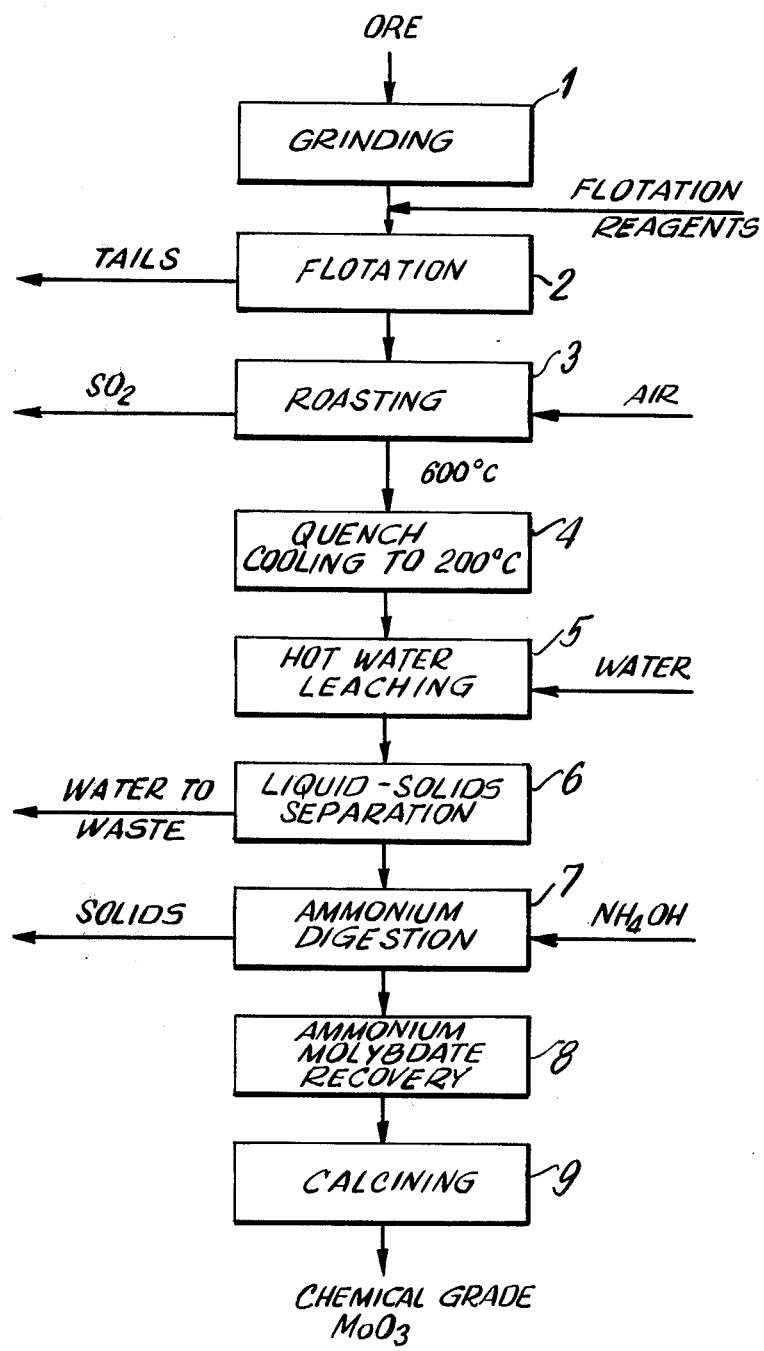
FIG. 1 is a schematic flow diagram of the process in accordance with the present invention.

Referring now to FIG. 1, molybdenite containing ore is crushed and ground to a particle size finer than about 35% plus 100 mesh to liberate the molybdenite from the siliceous gangue materials. The ground ore is slurried with water and flotation reagents, including a hydrocarbon oil and pine oil in combination with various wetting agents, is added to the slurry. The slurry is then fed to flotation cell 2 through which air is passed to form a froth which contains most of the molybdenite. In FIG. 1 the flotation stage is shown as a single operation but those skilled in the art will recognize that one or more flotation operations with intermediate grinding can be employed to insure economic recoveries of the molybdenite. The molybdenite containing froth is dewatered and the dewatered concentrate is sent to roasting unit 3 where the concentrate is heated and reacted with an excess of air to convert the molybdenum disulfide to molybdenum trioxide and sulfur dioxide which can be recovered for sulfuric acid manufacture. The roasting operation is conducted such that the molybdenum trioxide calcine leaves the roasting furnace at a temperature above about 525° C., advantageously above about 600° C., but below about 800° C. at which temperature molybdenum trioxide displays incipient stickiness. The hot calcine from the roasting unit is sent to quench unit 4 where it is cooled to a temperature below about 400° C. at a rate greater than about 30° C. per minute. The cooled calcine is then leached with water at a temperature between about 50° C. and 100° C. at step 5 to remove potassium. After leaching the slurry from hot water leaching step 5 is subjected to a liquid-solid separation in step 6 to recover molybdenum trioxide and an aqueous solution containing the leached impurities which is sent to waste after recovering any dissolved molybdenum values, if necessary or desirable. The molybdenum trioxide from hot water leaching is digested in an ammonium solution, advantageously ammonium hydroxide, to form an ammonium molybdate solution in step 7. Ammonium molybdates are recovered from the ammonium molybdate solution in step 8 by well known means, such as by crystallization or by acidification.

The ammonium molybdate can be calcined by known means in step 9 to provide chemical grade molybdenum trioxide.

Figure 2:
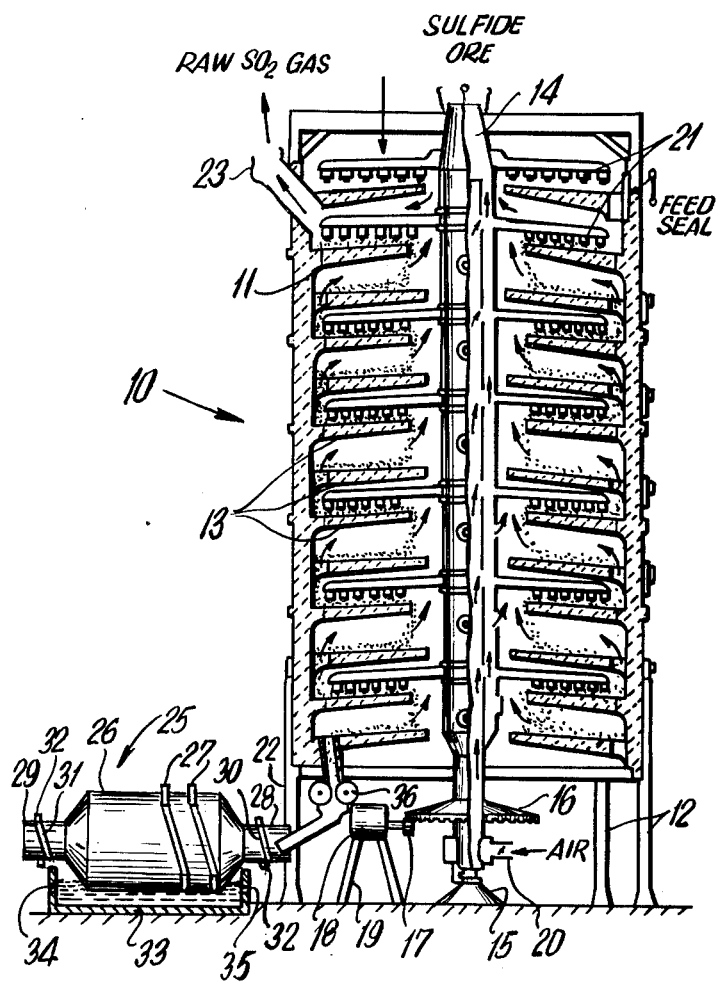
FIG. 2 is illustrative of an embodiment of a multi-hearth roasting furnace of the Nichols-Herreshoff-type.

The roasting and cooling steps of the process in accordance with the present invention can be conducted in a conventional multi-hearth type Nichols-Hereshoff furnace shown in FIG. 2. The furnace 10 is comprised of an outer shell 11 of suitable heat resistant material supported on legs 12, the furnace having a plurality of multilevel hearths 13, each having a centrally located annular opening through which a hollow shaft 14 passes and is rotationally supported by a base 15. The hollow shaft is provided with a bevelled gear 16 which is driven by drive gear 17 mounted on motor 18 which is supported on pillow block 19. The hollow shaft is provided with an air feed opening 20 through which air is fed, the hollow shaft having air exit openings at each hearth level through which the air flows into the rabble arms at each hearth level while circulating from the bottom to the top of the furnace. Air is fed by means not shown. The air conventionally circulates as shown by the arrows. However, certain hearths may have outlet flues to promote cross flow. The air flow serves a twofold purpose: it helps to keep the furnace from overheating; and, secondly, it provides the necessary oxidizing atmosphere for roasting the ore. Each hearth has associated with it rabble arms 21 which project radially outward from the shaft. Thus, as the shaft rotates the sulfide concentrate is fed from the top of the furnace and falls from hearth to hearth as the concentrate is being rabbled. The rabbling is such that on one hearth it is rabbled outwardly and deposits on the next hearth below, the rabble arms on the next hearth being adapted to move the concentrate radially inwardly until it deposits on the next succeeding hearth below, and so on. As the concentrate courses its way downward, it is converted to an oxide and is discharged as calcine at the bottom at 22. As the $SO_2$ forms it leaves with the flue gas at the top at 23. To practice the process in accordance with the present invention calcine at a temperature in excess of about 550° C. from roaster 10 is fed through discharge chute 22 through lump breaker 36 to screw cooler 25. Screw cooler 25 comprises a rotatable cylinder 26 having helical and hollow fins 27 which are open ended on the exterior. Both the charging end 28 and discharging end 29 are tapered to facilitate charging and discharging by helical flights 30 and 31, respectively. Screw cooler 25 is rotated by motors, not shown in FIG. 2, equipped with spur gears, not shown, to drive ring gears 32. Screw cooler 25 is mounted in tank 33 to which cool water is fed via port 34 and from which warm water is discharged via port 35. In operation calcine is fed to charging end 28 and as cooler 25 is rotated the calcine advances towards discharge end 29. As cooler 25 rotates fins 27 act like scoops as they emerge from the water and pick up cool water from tank 33. As rotation continues the water flows through the hollow fins to cool the calcine and upon further rotation fins 27 discharge somewhat warmer water. Because the calcine is continuously contacting fins 27 cooling is exceptionally rapid, i.e., greater than about 30° C. per minute.

Figure 3:
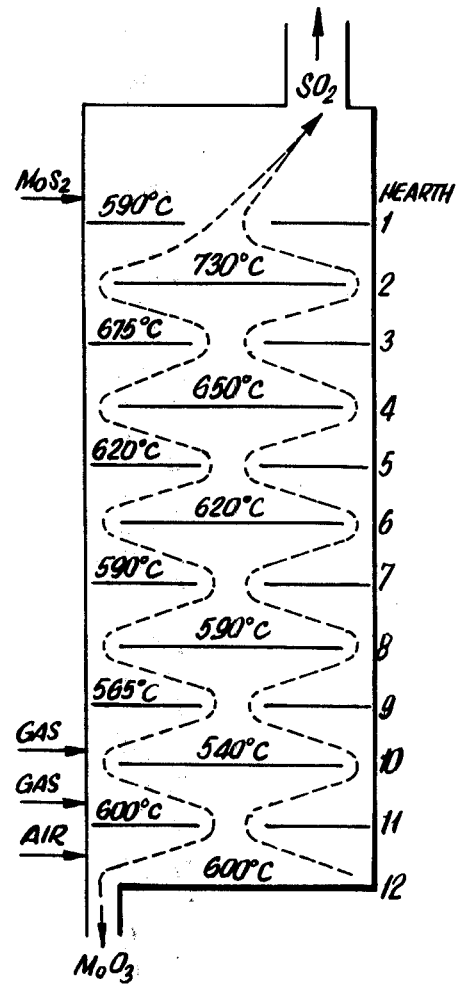
FIG. 3 shows diagramatically the steady state condition which may exist in a multi-hearth furnace.

Generally speaking, under ordinary roasting conditions, the temperature profile for hearths one to ten may reach a steady state along the lines shown diagramatically in FIG. 3 (the temperatures on hearths eleven and twelve are those for the practice of the present invention). As will be noted, the temperature appears to be highest at hearths numbers 2 to 4, the temperature falling within the range of about 650° C. and 730° C. The temperature on these hearths is frequently above preferred operating temperatures, while the temperature at the lower hearths is generally below desired operating temperatures.

The principal chemical reactions considered in the roasting process are as follows:

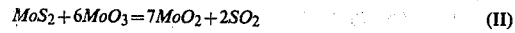

$$2MoS_2 + 7O_2 = 2MoO_3 + 4SO_2 \quad (I)$$

$$MoS_2 + 6MoO_3 = 7MoO_2 + 2SO_2 \quad (II)$$

$$2MoO_2 + O_2 = 2MoO_3 \quad (III)$$

Other reactions with a variety of intermediate compounds have been postulated. These three, however, appear to best represent the conversion process.

For purposes of roasting control, four furnace zones are recognized. The first two hearths, and on occasion, the third hearth, comprise the first zone. The flotation oil in the concentrate vaporizes and burns in this zone. Most of the converted molybdenum is present as a dioxide; only a small fraction is present as a trioxide. The temperature in this zone is controlled by restricting the air flow. Except when preheating, the first and second hearths are downdrafted to the third hearth. Normally the third hearth can be included in the second zone with hearths 4 and 6 inclusive. In this zone the molybdenite is rapidly converted to the dioxide; the proportion of the trioxide remains relatively low. Within design conversion capacity for the roaster, air flows to the second zone can always be increased sufficiently to lower hearth temperatures. Flue outlets on these hearths remain open as a means of promoting horizontal gas flow across the hearths.

The seventh and eighth hearths are in the third zone; the molybdenum disulfide and molybdenum dioxide are oxidized to the trioxide. Increasing airflow to this zone has the same effect as in the second zone, initially increasing the temperature and then decreasing the temperature as airflow increases. Normally the flue outlets remain open as in the second zone.

The ninth, tenth and eleventh hearths are in the fourth zone. These hearths are constantly updrafted to the seventh or eighth hearths. In this zone the sulfur content is reduced from possibly 0.7% to less than about 0.1%; oxidation to the trioxide is largely completed. With possibly 95% of the conversion accomplished on the eighth upper hearths, supplemental heat is required to maintain sufficient burden temperature to complete the oxidizing reaction, the point at which the sulfide oxidation no longer provides sufficient heat for final oxidation is often referred to as the "tail out" point. Gas burners may be used on the ninth hearth with production rates that are well below design capacity.

Because of the volatility of molybdic oxide and the mechanical problems associated with handling various mixtures of molybdenum disulfide, dioxide and trioxide at elevated temperatures, the conversion of molybdenite is best accomplished at relatively low temperature. Normally, hearth temperatures above the bottom hearth are in a range between about 540° C. and about 700° C. Preferred hearth temperatures can vary within the furnace and with the operator. In practice each operator prescribes a schedule of target temperatures considered ideal for a particular furnace. Several practices govern selection of operating temperatures. When temperatures are measured by thermocouples in the atmosphere, the recorded temperature may vary over a wide range depending upon its position with respect to air inlets, gas outlets, and the path of gas flow. There may also be differences between the measured temperature of the hearth atmosphere and the temperature of the hearth burden. Accretions on rabbles, rabble arms, center shaft column and exposed refractory tend to increase with temperature and favor selection of lower level temperature as a means of reducing labor requirements. Within some limits, increased temperature at the top of the furnace reduces dust loss. The typical distribution of the reaction, increasing temperatures on hearths three through seven can result with agglomerations whose interior will not oxidize. Particularly around the seventh hearth, it is advisable to select target temperatures below the point at which the burden exhibits properties similar to wet snow. All other factors equal, minimum sulfur content in a roasted concentrate is obtained with increasing temperature on hearths nine, ten and eleven.

In general, temperatures at the top of the furnace are elevated to the point of reduced dust loss; temperatures on the middle hearths are in the lower range of acceptable temperatures as a means of reducing operating difficulties; and temperatures at the bottom of the furnace are elevated in the direction of an acceptable product. In conventional practice, difficulty is experienced in discharging the product if the bottom hearth exceeds 450° C. For the purposes of the present invention, molybdenite concentrate can be roasted by conventional techniques except that the temperature of the calcine on the lowermost hearths is controlled so it can be discharged from roaster at a temperature in excess of about 525° C. Alternatively, the roaster can be operated in a conventional manner except that burners on the second and third lowermost hearths are operated so that the calcine falling on the lowermost hearth is at a temperature of at least about 525° C. and the calcine is then quenched on the lowermost hearth. Higher discharge temperatures can be achieved by providing the lower hearths with burners, advantageously, gas burners.

The above description of the operation and control of multi-hearth furnaces when roasting molybdenite concentrates demonstrates that the roasting reactions occurring on the higher hearths generate heat while the reactions on the lower hearths may require the addition of heat. The flotation reagents in the molybdenite concentrate are combusted on the uppermost hearths generating sufficient heat to initiate the roasting reactions which initially generate more heat because of the large quantities of sulfide sulfur that are present. On the upper hearth it is preferred to remove excess heat to minimize agglomeration of the molybdenite concentrate. Heat removal on the upper hearths can be accomplished by increasing air flow, as is conventionally done, or by spray cooling to provide an offgas having high $SO_2$ concentrations suitable for sulfuric acid manufacture. The process and apparatus used for spray cooling is described in U.S. Pat. No. 4,034,969 which is incorporated herein by reference. As the molybdenite concentrate is roasted as it courses downwardly through the roaster, the roasting reactions generate less heat and additional heat may have to be added to maintain the partially roasted concentrate at sufficiently high temperatures to insure substantially complete sulfur elimination. In conventional roasting practice, heat is added in such amounts and at selected hearths that the calcined concentrate is discharged from the roaster at a temperature between about 250° C. and about 450° C. These low discharge temperatures are employed to minimize materials handling problems. The process in accordance with the present invention departs from conventional practice by introducing sufficient heat at such locations that the calcined concentrate is discharged at a temperature greater than about 525° C., advantageously between about 600° C. and 650° C.

Potassium in molybdenum trioxide is rendered water soluble by heating molybdenum trioxide or holding the calcine from roasting at a sufficiently high temperature for a long enough time that upon quenching most of the potassium, e.g. at least about 95%, is removed with hot water leaching followed by liquid-solids separation and ammonium digestion followed by liquid-solids separation. The mechanism by which potassium is rendered soluble in hot water is not known, and the nature of the material being treated alters the minimum temperature and the holding time at that temperature which the material must be subjected to. For most molybdenum trioxide materials minimum temperatures of 550° C. and holding times of one hour are sufficient. When molybdenum trioxide is produced directly by roasting, holding times are not as important. Minimum temperatures and holding times for specific materials can be readily ascertained by heating the material to different temperatures for varying times, quenching the heated material and leaching. Nearly all materials can be treated by heating to at least about 600° C. for about one third of an hour.

The calcine discharged from the roaster at a temperature of at least about 525° C. is quench cooled at a rate sufficiently high to render potassium water soluble. Quench cooling can be either direct or indirect. For example, the calcine can be continuously introduced into water which is maintained at the leaching temperature (i.e. between about 50° C. and about 100° C.) by the heat of the calcine and by the addition of water to replenish water losses due to the generation of steam. Thus, the quenching and leaching steps can be effected in a single operation. Alternatively, the hot calcine can be fed to conventional indirect cooling devices, such as an indirect cooling screw. Whatever means are used to quench the hot calcine the calcine must be cooled to less than about 400° C. (advantageously, less than about 200° C.) at a rate greater than about 30° C. per minute, preferably at a rate of at least about 50° C. per minute, and most advantageously at a rate of at least about 100° C. It is the combination of the higher calcine discharge temperature and the faster rate of quenching the hot calcine that insures a final potassium content of less than about 100 ppm. Lower potassium contents in the final molybdenum trioxide product are achieved by rapidly cooling to lower temperatures, e.g., less than about 200° C., and faster cooling rates.

The impurities solubilized by quenching from the hot discharge temperature are leached from the calcine with hot water. The leaching temperature can vary in a wide range from between about 50° C. and about 100° C. but to insure best results from the standpoint of extent of potassium leaching while minimizing molybdenum dissolution the hot water is maintained at a temperature between about 75° C. and about 85° C. Leaching can be conducted in any conventional leaching apparatus that provides good liquid-solid contact and good mixing. After the molybdenum trioxide is separated from the hot leach liquor, it is dissolved in an ammonium solution containing between about 10% and 20% ammonium hydroxide at a temperature between about 40° C. and 80° C. Ammonium dimolybdate can be recovered from the solution after liquid-solid separation by evaporation crystallization. Calcining the ammonium dimolybdate produces chemical grade molybdenum trioxide containing less than 100 ppm potassium.

The process in accordance with the present invention can be used to treat molybdenite concentrates which upon conventional roasting would produce a product known in the trade as "technical molybdenum oxide". Such molybdenite concentrates may contain more than about 100 ppm potassium. Upon treatment by the process in accordance with the present invention a product, known as "chemical grade molybdenum oxide" containing less than about 100 ppm potassium can be produced.

In order to give those skilled in the art a better understanding of the present invention, the following illustrative examples are given.

EXAMPLE I

A molybdenite flotation concentrate containing between about 3000 ppm and 4000 ppm potassium was fed to a commercial sized twelve hearth Nichols-Herreshoff roaster operated in a conventional manner and in a manner simulating the present invention.

To test the present invention gas burners on hearths 10 and 11 were used to increase the temperature of the calcine on hearth 11 to greater than 600° C. A sample was taken from hearth 11 and quenched in water, and after leaching the calcine contained about 12 ppm potassium while the filtrate contained 11500 ppm molybdenum.

While maintaining the calcine on hearth 11 at about 600° C., the furnace was operated in such a fashion as to alter the temperature of the calcine on hearth 12 as shown in Table I. After cooling the calcine, samples were leached with hot water. After liquid-solid separation, the solids were digested in ammonium hydroxide and the molybdenum values were recoved by crystallization in a conventional manner. The crystallized ammonium molybdate was calcined to provide a chemical grade molybdenum oxide. The analysis of their potassium contents are shown in Table I.

TABLE I

| Temp. on Hearth 12, °C. | K content chemical grade oxide, ppm |
| --- | --- |
| 485 | 780 |
| 450 | 710 |
| 400 | 400 |
| 365 | 360 |
| 270 | 200 |

These tests show that the higher the cooling rate from hearth 11 to hearth 12, the lower the potassium content in the chemical grade oxide produced upon further processing.

In another test a sample was taken from hearth 9 after the roasting reactions had reached the point where the heat generated by the reactions was insufficient to sustain the temperature of the calcine. The size of the sample was sufficiently small that air cooling provided a cooling rate in excess of 50° C. per minute. The cooled sample was leached with water and further treated to produce chemical grade molybdenum oxide which had a potassium content of 31 ppm.

EXAMPLE II

A molybdenum concentrate having the same composition used in Example I was fed to the same roaster which was operated such that tail-out occurred on hearths 10 and 11. Samples were taken after tail out and cooled in air which provided a cooling rate in excess of 50° C. per minute. After leaching with hot water the potassium content of the chemical grade oxide was 25 ppm. Samples taken from conventionally cooled calcine were also water leached, and the chemical grade molybdenum oxide subsequently produced had potassium contents between 250 ppm and 610 ppm.

Although the present invention has been described in conjunction with preferred embodiments, it is to be understood that modifications and variations may be resorted to without departing from the scope of the invention as those skilled in the art will readily understand. Such modifications and variations are considered to be with in the purview and scope of the invention and the appended claims.

We claim:

1. A process for producing a purified ammonium molybdate solution from technical grade molybdenum trioxide containing more than about 100 ppm potassium which comprises heating the technical grade molybdenum trioxide to a temperature sufficiently high and for a time sufficiently long to render the potassium soluble in hot water, cooling the heated molybdenum trioxide to a temperature below about 400° C. at a cooling rate of at least about 30° C. per minute, leaching the cooled molybdenum trioxide with hot water to leach potassium therefrom thereby lowering the potassium content of the molybdenum trioxide to less than about 100 ppm, separating the molybdenum trioxide from the leach water, digesting the separated molybdenum trioxide in an ammonium solution to form a purified ammonium molybdate solution and separating the purified ammonium molybdate solution from undigested solids.

2. The process as described in claim 1 wherein the heated molybdenum trioxide is rapidly cooled to a temperature below about 200° C.

3. The process as described in claim 2 wherein the technical grade molybdenum trioxide is heated to a temperature above about 525° C.

4. The process as described in claim 2 wherein the technical grade molybdenum trioxide is heated to a temperature above about 600° C.

5. The process as described in claim 2 wherein the technical grade molybdenum trioxide is heated to a temperature between about 525° C. and about 800° C.

6. The process as described in claim 2 wherein the technical grade molybdenum trioxide is heated to a temperature between about 600° C. and about 650° C.

7. The process as described in claim 2 wherein the technical grade molybdenum trioxide is rapidly cooled at a cooling rate of at least about 50° C. per minute.

8. The process as described in claim 2 wherein the technical grade molybdenum trioxide is rapidly cooled at a cooling rate of at least about 100° C. per minute.

9. The process as described in claim 3 wherein the technical grade molybdenum trioxide is held at temperature for at least about one third of an hour.

10. The process as described in claim 3 wherein the hot water is maintained at a temperature between about 50° C. and about 100° C.

11. A process for producing a purified ammonium molybdate solution from technical grade molybdenum trioxide containing more than about 110 ppm potassium which comprises heating the technical grade oxide to a temperature of at least about 600° C., holding the heated molybdenum trioxide at said temperature for at least about one third of an hour, cooling the heated molybdenum trioxide to a temperature below about 400° C. at a cooling rate of at least about 30° C. per minute, leaching the cooled molybdenum trioxide with hot water to leach potassium therefrom, separating the molybdenum trioxide from the leach solution thereby lowering the potassium content of the molybdenum trioxide to less than about 100 ppm, digesting the separated molybdenum trioxide in an ammonium solution to form a purified ammonium molybdate solution and separating the purified ammonium molybdate solution from undigested solids.

12. The process as described in claim 11 wherein the heated molybdenum trioxide is rapidly cooled to a temperature below about 200° C.

13. A process as described in claim 12, wherein the technical grade molybdenum trioxide is heated to a temperature above about 600° C.

14. The process as described in claim 12 wherein the technical grade molybdenum trioxide is heated to a temperature between about 525° C. and about 800° C.

15. The process as described in claim 12 wherein the technical grade molybdenum trioxide is heated to a temperature between about 600° C. and about 650° C.

16. The process as described in claim 12 wherein the technical grade molybdenum trioxide is rapidly cooled at a cooling rate of at least about 50° C. per minute.

17. The process as described in claim 12 wherein the technical grade molybdenum trioxide is rapidly cooled at a cooling rate of at least about 100° C. per minute.

18. The process as described in claim 12 wherein the technical grade molybdenum trioxide is held at temperature for at least about one third of an hour.

19. The process as described in claim 12 wherein the hot water is maintained at a temperature between about 25° C. and about 100° C.

20. A process for producing a purified ammonium molybdate solution from a molybdenite concentrate containing more than about 100 ppm potassium which comprises heating the molybdenite concentrate to a temperature between about 550° C. and about 1400° C. in a free oxygen containing atmosphere to oxidize molybdenum disulfide to molybdenum trioxide having a sulfur content less than about 0.5%, cooling the molybdenum trioxide at a cooling rate greater than about 30° C. per minute to a temperature lower than about 400° C. from a temperature sufficiently high that the potassium is rendered soluble in hot water, leaching the cooled molybdenum trioxide with hot water to leach potassium therefrom thereby lowering the potassium content of the molybdenum trioxide to less than about 100 ppm, separating the molybdenum trioxide from the leach water, digesting the separating molybdenum trioxide in an ammonium solution to form a purified ammonium molybdate solution and separating that purified ammonium molybdate from undigested solids.

21. The process as described in claim 20 wherein the heated molybdenum trioxide is rapidly cooled to a temperature below about 200° C.

22. The process as described in claim 21 wherein the molybdenum trioxide is cooled from a temperature above about 525° C.

23. The process as described in claim 21 wherein the molybdenum trioxide is cooled from a temperature above about 600° C.

24. The process as described in claim 21 wherein the molybdenum trioxide is cooled from a temperature between about 525° C. and about 800° C.

25. The process as described in claim 21 wherein the molybdenum trioxide is cooled from a temperature between about 600° C. and about 650° C.

26. The process as described in claim 21 wherein the molybdenum trioxide is cooled at a cooling rate of at least about 50° C. per minute.

27. The process as described in claim 21 wherein the molybdenum trioxide is rapidly cooled at a cooling rate of at least about 100° C. per minute.

28. The process as described in claim 22 wherein the hot water is maintained at a temperature between about 50° C. and about 100° C.

29. A process for producing a purified ammonium molybdate solution from a molybdenite concentrate containing more than about 100 ppm potassium which comprises continuously feeding the concentrate to the uppermost hearth of a multi-hearth furnace containing a free oxygen containing atmosphere; passing the concentrate downwardly from one hearth to another through the bottom hearth thereof, at least some of the hearths being maintained at a temperature between about 550° C. and about 750° C. so that molybdenum disulfide is oxidized to molybdenum trioxide having a sulfur content of less than about 0.5%, cooling the molybdenum trioxide at a cooling rate greater than about 30° C. per minute to a temperature lower than about 400° C. from a temperature sufficiently high to render potassium soluble in water; leaching the cooled molybdenum trioxide with hot water to leach potassium therefrom thereby lowering the potassium content of the molybdenum trioxide to less than about 100 ppm; separating the molybdenum trioxide from the leach water; digesting the separated molybdenum trioxide in an ammonium solution to produce a purified ammonium molybdate solution; and separating the purified ammonium molybdate solution from undigested solids.

30. The process as described in claim 29 wherein the molybdenum trioxide is rapidly cooled to a temperature below about 400° C. on the lower hearth of the multi-hearth furnace by spraying water on the hot molybdenum trioxide.

31. The process as described in claim 30 wherein the molybdenum trioxide on the lowermost hearths is maintained at a temperature above about 525° C. by burners, and the molybdenum trioxide discharged from the multi-hearth furnace at a temperature above about 525° C.

32. The process as described in claim 31 wherein the molybdenum trioxide is rapidly cooled to a temperature below about 200° C.

33. The process as described in claim 32 wherein the molybdenum trioxide is maintained at a temperature above about 600° C.

34. The process as described in claim 33 wherein the molybdenum trioxide is maintained at a temperature between about 600° C. and about 650° C.

35. The process as described in claim 34 wherein the molybdenum trioxide is cooled at a cooling rate of at least about 50° C. per minute.

36. The process as described in claim 34 wherein the molybdenum trioxide is rapidly cooled at a cooling rate of at least about 100° C. per minute.

37. A process for producing a purified ammonium molybdate solution from a molybdenite concentrate containing more than about 100 ppm potassium which comprises continuously feeding the concentrate to the upper most hearth of a multi-hearth (furnaces) furnace containing a free oxygen containing atmosphere; passing the concentrate downwardly from one hearth to another through the bottom hearth thereof, at least some of the hearths being maintained at a temperature between about 550° C. and about 750° C. so that molybdenum disulfide is oxidized to molybdenum trioxide having a sulfur content of less than about 0.1%; cooling the molybdenum trioxide at a cooling rate greater than about 30° C. per minute to a temperature below about 400° C. from a temperature sufficiently high to render potassium soluble in water; leaching the cooled molybdenum trioxide with hot water to leach potassium therefrom thereby lowering the potassium content of the molybdenum trioxide to less than about 100 ppm; separating the molybdenum trioxide from the leach water; digesting the separated molybdenum trioxide in an ammonium solution to form a purified ammonium molybdate solution; and separating the purified ammonium molybdate solution from undigested solids.

38. The process as described in claim 37 wherein the molybdenum trioxide is rapidly cooled to a temperature below about 200° C. on the lower hearth of the multi-hearth furnace by spraying water on the hot molybdenum trioxide.

39. The process as described in claim 37 wherein the molybdenum trioxide on the lowermost hearths is maintained at a temperature above about 525° C. by burners, and the molybdenum trioxide discharged from the multi-hearth furnace at a temperature above about 525° C.

40. The process as described in claim 39 wherein the molybdenum trioxide is maintained at a temperature above about 600° C.

41. The process as described in claim 39 wherein the molybdenum trioxide is maintained at a temperature between about 600° C. and about 650° C.

42. The process as described in claim 41 wherein the molybdenum trioxide is cooled at a rate of at least about 50° C. per minute.

43. The process as described in claim 39 wherein the molybdenum trioxide is rapidly cooled at a cooling rate of at least about 100° C. per minute.

44. The process as described in claim 41 wherein ammonium molybdates are recovered from the purified ammonium molybdate solution and the ammonium molybdates are calcined to provide a chemical grade molybdenum trioxide product.

* * * * *